United States Patent [19]

Hasselskog

[11] Patent Number: 4,850,674

[45] Date of Patent: Jul. 25, 1989

[54] MEANS FOR KEEPING AN OPTICAL LENS IN A DESIRED POSITION IN A LENS HOLDER UNDER VARYING TEMPERATURE

[75] Inventor: Karl J. O. Hasselskog, Västra Frölunda, Sweden

[73] Assignee: Telefonaktiebolaget L M Ericsson, Stockholm, Sweden

[21] Appl. No.: 205,687

[22] Filed: Jun. 13, 1988

[30] Foreign Application Priority Data

Jul. 3, 1987 [SE] Sweden ............................ 8702765

[51] Int. Cl.⁴ ............................................ G02B 7/02
[52] U.S. Cl. ............................................ 350/253
[58] Field of Search ............... 350/253, 252; 248/593, 248/601, 603, 604

[56] References Cited

U.S. PATENT DOCUMENTS

| 3,671,108 | 6/1972 | Kilgus | 350/253 |
| 4,506,951 | 3/1985 | Yamada | 350/253 |

FOREIGN PATENT DOCUMENTS

| 517086 | 10/1955 | Canada | 350/253 |
| 2362041 | 6/1974 | Fed. Rep. of Germany | |
| 5766409 | 10/1980 | Japan | |
| 58-87506 | 5/1983 | Japan | |
| 58-87508 | 5/1983 | Japan | |
| 58-159509 | 9/1983 | Japan | |
| 59-31912 | 2/1984 | Japan | |
| 59-31914 | 2/1984 | Japan | 350/253 |
| 60-230609 | 11/1985 | Japan | 350/253 |

Primary Examiner—Rodney B. Bovernick
Assistant Examiner—Loha Ben
Attorney, Agent, or Firm—Burns, Doane, Swecker & Mathis

[57] ABSTRACT

An optical lens is kept in a desired position in a lens holder by a means. The back of the lens engages against a fixed abutment and the means has a tubular keeper which is threaded into the holder. The keeper is divided by slits into deflectable supports. These are kept in engagement against the peripheral surface of the lens by a ring which is a part of the means. The thickness (t) and width (b) of the supports are selected such that they are practically stiff in a tangential direction and yielding in a radial direction. To have low weight, the holder (1) and keeper (5) are of aluminum. The lens (2) is of glass and the ring (9) of titanium, the coefficient of linear expansion of which agrees closely with that of the glass. For temperature variations, the holder (1) and keeper (5) will be subjected to relatively large change in length, while the ring (9) keeps the engagement surfaces (10) of the supports (7) in engagement against the peripheral surface (8) of the lens (2). A diametrically opposed pair of the supports (7) then keeps the optical axis (C) of the lens in its position in the holder (1) in the tangential direction of the supports.

18 Claims, 3 Drawing Sheets

MEANS FOR KEEPING AN OPTICAL LENS IN A DESIRED POSITION IN A LENS HOLDER UNDER VARYING TEMPERATURE

TECHNICAL FIELD

The invention relates to a means for keeping an optical lens in a desired position in a lens holder under varying temperature, said means including a keeper fixed in the lens holder and engaging against the peripheral surface of the lens facing away from its optical axis for keeping the lens in position in the transverse direction of the optical axis, the coefficient of linear expansion of the holder differing from that of the lens.

BACKGROUND ART

In optical instruments it is essential that the lenses of an instrument have a well defined position in their lens holders and that the instrument has low weight. For instruments subjected to temperature variations, problems often occur due to the coefficient of linear expansion of the lens differing from that of the lens holder. There can be play between lens and holder, or the lens can be subjected to compressive stresses and be deformed so that its optical performance is changed. For example, there is a diameter difference of 0.17 mm between the lens and holder for a glass lens of 110 mm diameter and a holder of aluminum for a difference in temperature of 110 degrees. The permitted radial movement of the lens will only be 0.024 mm, however, for a focal length of 120 mm and a permitted angular deviation of 0.2 mrad in the lens. It has been proposed that the lens holder is made from a material having a coefficient of linear expansion which closely agrees with that of the lens. Titanium is a suitable material for a glass lens, but this material is expensive and considerably heavier than aluminum, for example. It has also been proposed that the lens is fastened in a radially resilient holder, as illustrated in the Japanese Patent No. 59-31914. The accuracy of this type of lens holder has been found insufficient in many instrument applications, however. An alternative resilient lens holder for a plastics lens is shown in the U.S. Pat. No. 4,506,951. In this holder the lens is formed with a thin edge part extending round the lens, and which is elastically deformable in a radial direction. This lens holder cannot be applied to a glass lens, however.

DISCLOSURE OF INVENTION

The difficulties mentioned hereinbefore are solved in accordance with the invention by a means including a keeper having supports which are radially deflectable and tangentially stiff, the keeper being kept in engagement against the lens by a ring included in the means, the ring having the same coefficient of linear expansion as the lens.

The means has the characterizing features disclosed in the accompanying claims.

BRIEF DESCRIPTION OF DRAWINGS

The invention will now be described in more detail in connection with a drawing, where.

BEST MODE FOR CARRYING OUT THE INVENTION

Figure 1:
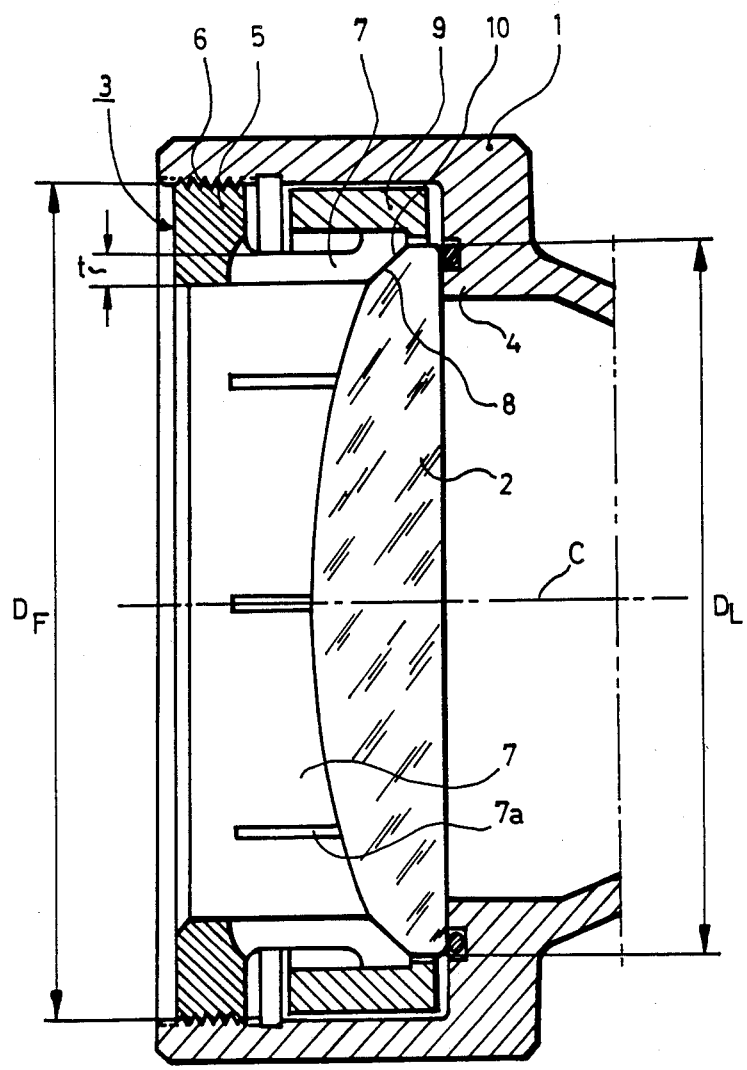
FIG. 1 is a longitudinal section of a lens holder with an inventive means.

In FIG. 1 there is illustrated a lens holder 1 in which a circular lens 2 is maintained in position with the aid of an inventive means 3. Conventionally, the lens holder 1 has a fixed abutment 4 accommodating a soft sealing ring, the back of the lens 2 engaging against the ring and abutment. The fixed abutment 4 determines the direction of the optical axis C of the lens 2 in relation to the lens holder 1, and also the position of the lens in the lens holder along the optical axis C. The lens 2 is kept in the desired position in the transverse direction of the optical axis C with the aid of the means 3. When there are temperature variations, the diameter $D_L$ of the lens 2 and the inside diameter $D_F$ of the holder 1 will be changed by different amounts, since the materials in lens and holder have different coefficients of linear expansion. In the present embodiment, the lens 2 is made from glass with a coefficient of linear expansion $\alpha_G = 8.7 \times 10^{-6}$ 1/degree and the holder 1 from aluminum with a coefficient of linear expansion $\alpha_A = 23 \times 10^{-6}$ 1/degree.

The inventive means 3 prevents this difference in the materials from resulting in a risk that the optical axis C of the lens can be displaced radially, as will be described in more detail below.

The means 3 in FIG. 1 includes a keeper 5, which is tubular and is made from aluminum, partly to have low weight and partly to have the same coefficient of linear expansion as the lens holder 1. At one end the keeper has an external thread 6 meshing with a corresponding internal thread on the holder 1. Departing from the threaded part, the keeper 5 has supports 7 which are radially deflectable and engage against a circumferential surface of the lens 2 facing away from its optical axis C. The supports 7 have been made deflectable by the keeper 5 being provided with slits 7a. The means 3 has a second part consisting of a ring 9 of titanium, with a coefficient of linear expansion $\alpha_T = 9 \times 10^{-6}$ 1/degree, which closely agrees with the coefficient of linear expansion of the glass lens. The ring 9 surrounds the supports 7 and its inside engages against the outside of the supports to keep them in engagement against the lens 2. According to the embodiment illustrated, the circumferential surface 8 of the lens 2 slopes in relation to the optical axis C, and the engagement surfaces 10 of the supports 7 engaging against the lens have a corresponding slope. The means 3 can thus also keep the lens 2 in engagement against the fixed abutment 4. In an alternative embodiment, the circumferential surface of the lens is circular cylindrical and the supports are straight in the direction of the optical axis C. In this case the lens is kept into engagement against the fixed abutment 4 by axially directed supports, which are not illustrated in FIG. 1.

Figure 2:
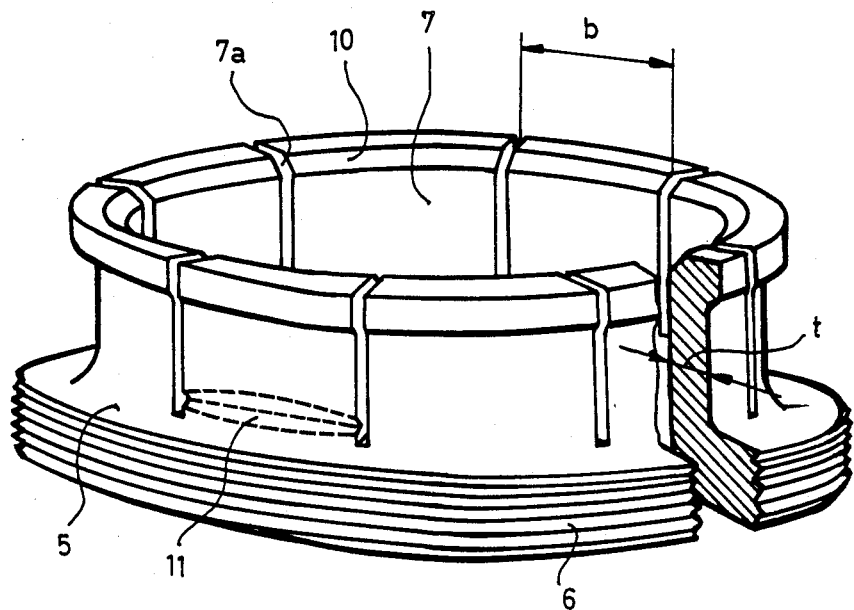
FIG. 2 is a perspective view of the keeper included in the means.

The perspective view of FIG. 2 illustrates the tubular keeper 5, and from the Figure it is apparent that the supports are eight in number. This number of supports and the thickness t in the radial direction of the supports 7 are selected such that the thickness t is substantially less than the width b of the supports in a tangetial direction. The supports will thus be very stiff tangentially and relatively flexible and easy to deflect in a radial direction. To make the support even more yielding radially, grooves 11 can be made in them in a tangential direction, as illustrated in the Figure by dashed lines.

As mentioned, the lens is circular and the engagement surface of each support 7 extends over approximately one-eight of a circle. Two diametrically opposed supports retain the lens 2 and keep it from being laterally displaced between the supports in the tangential direction of these two supports. Other diametrically opposed pairs of supports prevent the lens 2 from being laterally displaced in the tangential direction of these other supports, so that the optical axis C of the lens 2 is kept in its position in relation to the supports 7. As mentioned, the supports are stiff for movements in their tangential direction, and the optical axis C of the lens is thus kept in position by the supports 7 in relation to the holder 1. For temperature variations, the lens 2 is kept in its position in the holder 1 in the transverse direction of the optical axis C in the following manner. For increasing temperature the inside diameter $D_F$ of the holder and the threaded part of the keeper 5 expand to the same amount. The keeper is kept in its position in the holder without any play occuring between the holder 1 and keeper 5 at the thread 6. The lens 2 increases in diameter to a less extent than the holder since the lens has a lesser coefficient of linear expansion than the holder. The diameter of the titanium ring 9 surrounding the supports 7 increases for increasing temperature only slightly more than the lens diameter. The ring 9 thus keeps the engagement surfaces 10 of the supports 7 in close engagement against the circumferential surface 8 of the lens 2 for temperature variations, and the play which can occur between the supports 7 and the lens 2 is very small. The optical axis of the lens will thus retain its position in relation to the holder 1 after a change in temperature also. The mentioned play can be compensated by the supports 7, which are of aluminum and which, have suitable thickness between the lens 2 and ring 9. The increase in thickness of the supports for a rise in temperature corresponds to the increasing diameter difference occuring between the ring 9 and the lens 2, so that keeping the lens in position is further improved.

Figure 3:
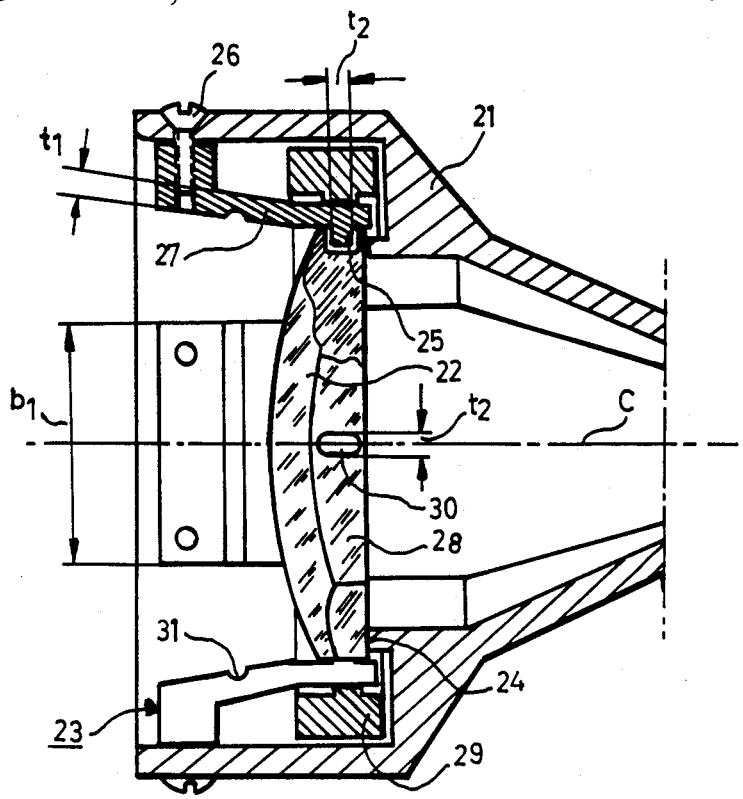
FIG. 3 is a longitudinal section of an alternative embodiment of the invention.

In FIG. 3 there is illustrated an alternative embodiment of an inventive means 23 for a rectangular lens 22 in a lens holder 21. The back of the lens engages a fixed abutment 24 and is kept in position in transverse direction of the optical axis C by the means 23. The means has four deflectable supports 27, each being fixed at one end to the lens holder 21 by screws 26. At their other ends the supports each engage against a side surface 28 of the lens 22. The supports are kept in engagement against the side surface with the aid of a ring-like element 29, which surrounds the supports 27. These have a relatively small thickness $t_1$ and are provided with grooves 31 to make them yielding and easily deflectable in a direction towards the optical axis C and respective opposing support. The width $b_1$ of the supports 27 is of a magnitude such that the supports are practically rigid in their width direction. Each support 27 has a pin 25 with a diameter $t_2$ the pin being accommodated in a corresponding recess 30 in the side surfaces of the lens 22. These recesses 30 have the same width $t_2$ as the pins 25 and the lens is kept fixed to each support 27 in its width direction by the pin. The recesses 30 are elongate, with their greatest extension in the direction of the optical axis C, so that the lens 22 may still engage against the fixed abutment 24 for changes in extension of the supports 27 in an axial direction when temperature variations occur. The lens may be of glass, the ring-like element 29 of titanium, and the lens holder 21 of aluminum, as with the previously described embodiment, but other material combinations are possible. For example, the lens 22 may be of plastics with a coefficient of linear expansion $\alpha_P = 70 \times 10^{-6}$ 1/degree, and the ringlike element 29 may be of the same material. For temperature variations the lens holder 21 and lens 22 will vary in size in relation to each other in the transverse direction of the optical axis C. The supports 27 will then be kept in engagement against the lens 22 by the ring-like element 29 and be deflected in relation to the lens holder 21. The optical axis C of the lens keeps its position in relation to the holder 21 by the supports being stiff in their width direction and by the lens being fixed against the supports 27 with the aid of the ring-like element 29 and the pins 25 in the recesses 30.

Figure 4:
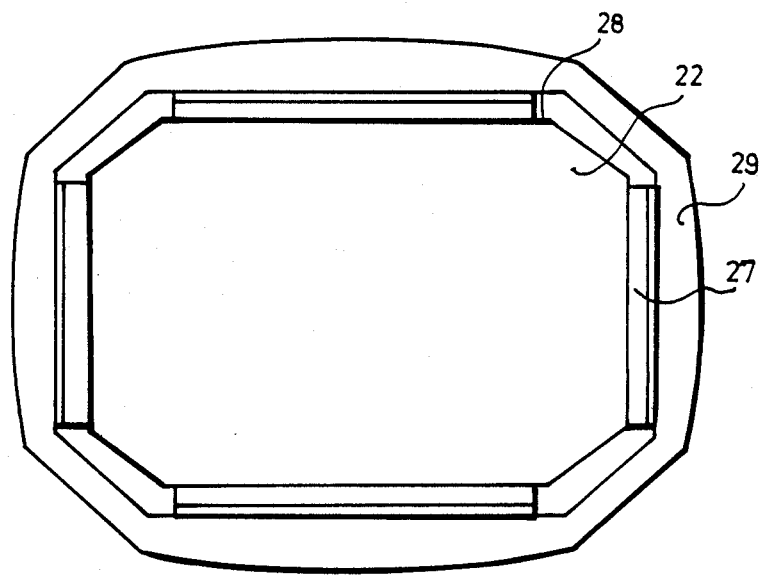
FIG. 4 is a side view of the embodiment illustrated in FIG. 3.

The ring-like element 29 is illustrated in FIG. 4, which is a side view in relation to the section in FIG. 3, and taken from the back of the lens 22. The element 29 surrounds the lens 22 and keeps the deflectable supports in engagement against the side surfaces 28 of the lens.

The means described above for keeping a lens in its holder under varying temperature has the advantage that the position of the lens will be well fixed. The ring-like element, which has a coefficient of linear expansion agreeing with that of the lens, is relatively small and has low weight, added to which the material in the holder can be selected without regard to its coefficient of linear expansion.

I claim:

1. Means for keeping an optical lens in a desired position in a lens holder under varying temperature, said means including a keeper fixed in the lens holder and engaging against a peripheral surface of the lens facing away from the optical axis of the lens for keeping the lens in position in a direction transverse to the optical axis, the coefficient of linear expansion of the holder differing from that of the lens, wherein the means has deflectable supports surrounding the lens, said supports being deflectable in relation to the lens holder, the means also having at least one ring-like element surrounding the supports for keeping them in engagement against said peripheral surface of the lens, each of the supports being deflectable in a direction transverse to the optical axis, and substantially stiff in a lateral direction transverse to this deflecting direction, the supports situated on opposite sides of the lens being arranged to keep the lens in place in said lateral direction, the ring-like element having substantially the same coefficient of linear expansion as that of the lens and under temperature variations keeps the supports in engagement against the lens, so that for temperature variations the supports are deflected and the optical axis of the lens maintains its position in relation to the lens holder.

2. Means as claimed in claim 1, wherein the material thickness of the supports, between the ring-like element and the peripheral surface of the lens, and the coefficient of linear expansion of the supports are selected such that the difference in the change in length of the lens and ring-like element in the direction transverse to the optical axis which for temperature variations occurs between the lens and the ring-like element is compensated by the changing in thickness of the supports.

3. Means as claimed in claim 2, wherein the lens holder is of aluminum and the lens of glass, and wherein the ring-like element is of titanium and the supports are of aluminum.

4. Means as claimed in claim 3, wherein the lens and lens holder are circular, and wherein the means includes a tubular keeper having slits at one end and extending in the direction of the optical axis, the keeper being thus formed into said deflectable supports with the aid of said slits.

5. Means as claimed in claim 4, wherein the peripheral surface of the lens facing away from the optical axis is conical and that the engagement surfaces of the supports against the peripheral surface have a corresponding configuration.

6. Means as claimed in claim 2, wherein the lens and lens holder are circular, and wherein the means includes a tubular keeper having slits at one end and extending in the direction of the optical axis, the keeper being thus formed into said deflectable supports with the aid of said slits.

7. Means as claimed in claim 6, wherein the peripheral surface of the lens facing away from the optical axis is conical and that the engagement surfaces of the supports against the peripheral surface have a corresponding configuration.

8. Means as claimed in claim 1, wherein the lens and lens holder are circular, and wherein the means includes a tubular keeper having slits at one end and extending in the direction of the optical axis, the keeper being thus formed into said deflectable supports with the aid of said slits.

9. Means as claimed in claim 8, wherein the peripheral surface of the lens facing away from the optical axis is conical and that the engagement surfaces of the supports against the peripheral surface have a corresponding configuration.

10. A retaining device for an optical lens comprising,
an optical lens holder means for holding said lens, said lens holder means having a coefficient of linear expansion differing from that of said lens,
a retention means disposed in said lens holder means for retaining an optical axis of said lens in position in relation to said lens holder means, said retention means having a plurality of deflectable supports in engagement against a peripheral surface of said lens, said supports being radially deflectable in relation to said optical axis of said optical lens, and
a ring means disposed within said lens holder means surrounding said supports for keeping said supports in engagement against said peripheral surface of said lens during temperature variations between said lens and said ring means, said ring means having substantially the same coefficient of linear expansion as that of said lens.

11. An optical lens retaining device as claimed in claim 10, said supports having a material thickness and a coefficient of linear expansion such that the difference in linear expansion occuring between said lens and said ring means during temperature variations is compensated by said supports.

12. An optical lens retaining device as claimed in claim 11, said optical lens being made of glass, said lens holder means being made aluminum, said ring means being made of titanium, and said supports being made of aluminum.

13. An optical lens retaining device as claimed in claim 12, said lens and lens holder means being circular, said retention means being tubular and having a plurality of axially extending slits disposed at one end to form said supports.

14. An optical lens retaining device as claimed in claim 13, said peripheral surface of said lens being conical, said supports having engagement surfaces corresponding to said peripheral surface of said lens.

15. An optical lens retaining device as claimed in claim 11, said lens and lens holder means being circular, said retention means being tubular and having a plurality of axially extending slits disposed at one end to form said supports.

16. An optical lens retaining device as claimed in claim 15, said peripheral surface of said lens being conical, said supports having engagement surfaces corresponding to said peripheral surface of said lens.

17. An optical lens retaining device as claimed in claim 10, said lens and lens holder means being circular, said retention means being tubular and having a plurality of axially extending slits disposed at one end to form said supports.

18. An optical lens retaining device as claimed in claim 17, said peripheral surface of said lens being conical, said supports having engagement surfaces corresponding to said peripheral surface of said lens.

* * * * *